(12) United States Patent
Karam et al.

(10) Patent No.: US 10,293,551 B2
(45) Date of Patent: May 21, 2019

(54) ROOM TEMPERATURE GLASS-TO-GLASS, GLASS-TO-PLASTIC AND GLASS-TO-CERAMIC/SEMICONDUCTOR BONDING

(71) Applicant: PICOSYS INCORPORATED, Santa Barbara, CA (US)

(72) Inventors: Raymond Miller Karam, Santa Barbara, CA (US); Georges Roussos, San Jose, CA (US); Mark Finkle, Goleta, CA (US); Daniella M. Harvey, Santa Barbara, CA (US); Pascal R. Ackermann-Karam, Santa Barbara, CA (US)

(73) Assignee: PICOSYS INCORPORATED, Santa Barbara, CA (US)

( * ) Notice: Subject to any disclaimer, the term of this patent is extended or adjusted under 35 U.S.C. 154(b) by 0 days.

(21) Appl. No.: 15/275,187

(22) Filed: Sep. 23, 2016

(65) Prior Publication Data
US 2017/0008223 A1    Jan. 12, 2017

Related U.S. Application Data

(62) Division of application No. 13/291,956, filed on Nov. 8, 2011, now Pat. No. 9,492,990.

(51) Int. Cl.
*B29C 65/16*    (2006.01)
*B29C 65/78*    (2006.01)
(Continued)

(52) U.S. Cl.
CPC .... *B29C 65/1612* (2013.01); *B01L 3/502707* (2013.01); *B23K 26/032* (2013.01);
(Continued)

(58) Field of Classification Search
CPC ............ B23K 26/0853; B23K 26/0861; B23K 26/20; B23K 26/324; B29C 65/1683;
(Continued)

(56) References Cited

U.S. PATENT DOCUMENTS

| 4,636,609 A | 1/1987 | Nakamata |
| 5,045,668 A * | 9/1991 | Neiheisel ............. B23K 26/032 |
| | | 219/121.63 |

(Continued)

FOREIGN PATENT DOCUMENTS

| CN | 1320067 A | 10/2001 |
| CN | 101214580 A | 7/2008 |

(Continued)

OTHER PUBLICATIONS

Machine translation of Japan Patent document No. 09-085,481, Feb. 2018.*

(Continued)

*Primary Examiner* — Geoffrey S Evans
(74) *Attorney, Agent, or Firm* — Felix L. Fischer

(57) ABSTRACT

A process for room temperature substrate bonding employs a first substrate substantially transparent to a laser wavelength is selected. A second substrate for mating at an interface with the first substrate is then selected. A transmissivity change at the interface is created and the first and second substrates are mated at the interface. The first substrate is then irradiated with a laser of the transparency wavelength substantially focused at the interface and a localized high temperature at the interface from energy supplied by the laser is created. The first and second substrates immediately adjacent the interface are softened with diffusion across the interface to fuse the substrates.

10 Claims, 9 Drawing Sheets

(51) Int. Cl.
| | |
|---|---|
| *B23K 37/04* | (2006.01) |
| *B23K 26/324* | (2014.01) |
| *B23K 26/08* | (2014.01) |
| *B32B 37/06* | (2006.01) |
| *B23K 26/03* | (2006.01) |
| *B23K 26/046* | (2014.01) |
| *B29C 65/00* | (2006.01) |
| *B01L 3/00* | (2006.01) |
| *C03B 23/203* | (2006.01) |
| *C03C 27/00* | (2006.01) |
| *B23K 26/082* | (2014.01) |
| *B23K 26/0622* | (2014.01) |
| *B23K 26/32* | (2014.01) |
| *B23K 26/211* | (2014.01) |
| *B23K 26/244* | (2014.01) |
| *B23K 101/18* | (2006.01) |
| *B23K 101/40* | (2006.01) |
| *B23K 103/18* | (2006.01) |
| *B23K 103/00* | (2006.01) |

(52) U.S. Cl.
CPC ........ *B23K 26/046* (2013.01); *B23K 26/0622* (2015.10); *B23K 26/082* (2015.10); *B23K 26/0853* (2013.01); *B23K 26/211* (2015.10); *B23K 26/244* (2015.10); *B23K 26/32* (2013.01); *B23K 26/324* (2013.01); *B23K 37/0435* (2013.01); *B29C 65/1635* (2013.01); *B29C 65/1638* (2013.01); *B29C 65/1654* (2013.01); *B29C 65/1683* (2013.01); *B29C 65/7841* (2013.01); *B29C 65/7847* (2013.01); *B29C 66/1122* (2013.01); *B29C 66/45* (2013.01); *B29C 66/7392* (2013.01); *B29C 66/7465* (2013.01); *B32B 37/06* (2013.01); *C03B 23/203* (2013.01); *C03C 27/00* (2013.01); *B01L 2200/12* (2013.01); *B01L 2300/0887* (2013.01); *B23K 2101/18* (2018.08); *B23K 2101/40* (2018.08); *B23K 2103/18* (2018.08); *B23K 2103/42* (2018.08); *B23K 2103/50* (2018.08); *B23K 2103/52* (2018.08); *B23K 2103/54* (2018.08); *B29C 66/73161* (2013.01); *B32B 2307/412* (2013.01); *B32B 2310/0843* (2013.01); *B32B 2315/08* (2013.01)

(58) Field of Classification Search
CPC ............ B29C 65/1612; B29C 65/1635; B29C 65/1638; B29C 65/1654; B29C 65/7841; B29C 65/7847
See application file for complete search history.

(56) References Cited

U.S. PATENT DOCUMENTS

| | | | | |
|---|---|---|---|---|
| 5,101,089 A | * | 3/1992 | Bortolotto | B23K 26/1476 219/121.63 |
| 5,304,773 A | * | 4/1994 | Kilian | B23K 26/04 219/121.78 |
| 7,068,891 B1 | * | 6/2006 | Cook | G02B 6/4227 385/52 |
| 8,308,890 B2 | | 11/2012 | Koops et al. | |
| 9,016,091 B2 | | 4/2015 | Matsumoto | |
| 2004/0056006 A1 | * | 3/2004 | Jones | B29C 65/1683 219/121.64 |
| 2004/0071394 A1 | | 4/2004 | Gfrorer et al. | |
| 2004/0082145 A1 | | 4/2004 | Reichenbach et al. | |
| 2007/0158316 A1 | | 7/2007 | Williams | |
| 2010/0044355 A1 | * | 2/2010 | Nomaru | B23K 26/048 219/121.67 |
| 2010/0047587 A1 | | 2/2010 | Itoh et al. | |
| 2010/0304151 A1 | | 12/2010 | Tuennermann et al. | |
| 2011/0051250 A1 | | 3/2011 | Fujita et al. | |
| 2011/0084426 A1 | | 4/2011 | Nakamura et al. | |
| 2011/0200791 A1 | | 8/2011 | Kugelmann et al. | |
| 2011/0287607 A1 | | 11/2011 | Osako et al. | |
| 2012/0101540 A1 | | 4/2012 | O'Brien et al. | |
| 2012/0161305 A1 | | 6/2012 | Ruben et al. | |

FOREIGN PATENT DOCUMENTS

| | | | |
|---|---|---|---|
| CN | 101553340 A | | 10/2009 |
| CN | 102112294 A | | 6/2011 |
| EP | 158528 A1 | | 10/1985 |
| EP | 1238781 A1 | | 9/2002 |
| JP | 60246828 S | | 12/1985 |
| JP | 09-085481 A | * | 3/1997 |
| JP | 2000001598 A | | 1/2000 |
| JP | 2000343264 A1 | | 12/2000 |
| JP | 2003136600 A | | 5/2003 |
| JP | 2003-340587 A | * | 12/2003 |
| JP | 2005-066604 A | * | 3/2005 |
| JP | 2007222940 A | | 9/2007 |
| JP | 2009173023 A | | 8/2009 |
| JP | 2010052009 A | | 3/2010 |
| JP | 2011001260 A | | 1/2011 |
| JP | 2011038201 A | | 2/2011 |
| JP | 2011048081 A | | 3/2011 |
| JP | 2011056519 A | | 3/2011 |
| JP | 2011102230 A | | 5/2011 |
| TW | 201127533 A | | 8/2011 |
| WO | WO-0020157 A1 | * | 4/2000 |
| WO | 2011065103 A1 | | 6/2011 |
| WO | 2011123670 A2 | | 10/2011 |
| WO | 2010035696 A1 | | 2/2012 |

OTHER PUBLICATIONS

Machine translation of Japan Patent document No. 2003-340,587, Feb. 2018.*
Machine translation of Japan Patent document No. 2005-066,604, Feb. 2018.*
www.festo.com, "Clamping Modules EV-63-5", Sep. 2018.*
Shanghai Welding Association, "Advanced Welding Technology" Shanghai Science and Technology Literature Press, pp. 17, Aug. 31, 2010.

\* cited by examiner

ROOM TEMPERATURE GLASS-TO-GLASS, GLASS-TO-PLASTIC AND GLASS-TO-CERAMIC/SEMICONDUCTOR BONDING

REFERENCE TO RELATED APPLICATIONS

This application is a divisional of U.S. application Ser. No. 13/291,956 filed on Nov. 8, 2011 entitled ROOM TEMPERATURE GLASS-TO-GLASS, GLASS-TO-PLASTIC AND GLASS-TO-CERAMIC/SEMICONDUCTOR BONDING having a common assignee with the present application, the disclosure of which is incorporated herein by reference.

BACKGROUND INFORMATION

Field

Embodiments of the disclosure relate generally to the field of bonding of transparent substrates and more particularly to a method for room temperature laser bonding of a first laser wavelength transparent substrate to a second substrate with an intermediate heat absorption layer.

Background

Bonding of glass-to-glass substrates and other combinations of transparent and non-transparent substrates for biological slides and microfluidics applications as well as other applications typically requires heating of the substrates to obtain bonding diffusion of the materials across the substrate boundaries unless adhesives are employed. Various examples of current bonding practices are fusion bonding, anodic bonding of sodium rich glass to semiconductors and adhesive bonding.

Fusion bonding glass-to-glass is effective on polished or low roughness glass surfaces. To achieve a strong, bubble free bond, typically the surface finish should be on the order of a few Angstrom RA. The process generally involves placing the two glass substrates in contact with each other and then applying pressure and heat. The pressure can range from the weight of the upper glass substrate to a load place on top of the glass. Special material must be used to prevent the weight from sticking to the glass. The bulk substrate is usually brought up to at least the first transition temperature (softening temperature) of the glass. For all practical purposes, the glass surfaces melt together and become one. This process is not very robust against environmental particles that are commonly found in a clean room environment. A 50 nm diameter particle, for example, will cause the glass not to bond in that particular area and cause a glass bubble which is apparent by the presence of Newton Rings.

This process can be assisted by treating the surface with ions such as calcium and activating the surface with Hydrofluoric Acid. Such treatments tend to lower the bonding temperatures but aggravate the contamination problem. Contamination becomes more difficult because the particulate does not have the ability to deform the glass such that the particle of contamination will recess out of the way and not hold the two surfaces apart.

Fusion bonding has two competing issues that cause a low yield; the glass surface must be absolutely clean in order to not create air bubbles at low temperatures, and when higher temperatures are used, while air gaps become less a problem, the surface of the glass becomes distorted and must be reprocessed in order to make it optically clear again. Higher temperatures can also cause the glass to become hazed or yellowish.

While there are a few exceptions, it is generally not possible to bond glass-to-glass with an Anodic bonding process. This process is usually reserved for bonding glass to silicon. Anodic bonding is usually performed using glass substrate with sodium as one of its constituents. The temperature is generally elevated to approximately 400 degrees Celsius. A potential difference is then applied to drive the sodium atoms across the boundary of the glass-silicon assembly. This process creates a sodium-oxide bond across the boundary. This process usually leaves the surface of the glass transparent and smooth. However, it is assumed that the bonding process is taking place near a channel, the depletion of the sodium atoms from the surface of the glass near the bonded interface layer, leave the glass sodium rich. This surface is then positively charged. Such a charge on the surface of the glass can easily interfere with downstream processes during the use of the chip.

There are adhesives specifically designed to bond glass to glass. While adhesive is easy to apply, it is very hard to make a bubble free joint. It is also very hard to pattern adhesive such that the bond line is complete but does not squeeze out from between the surfaces being bonded and into a neighboring channel. Adhesives can be hazardous to the downstream process. Certain adhesive compositions can kill the biology that the component is being made to house.

Each of the above bonding processes does not render a chemically inert bonding process. In each case the bond lines are not robust against strong concentrations of acid or bases. They will tend to etch at a much higher rate than that of the bulk surface. The higher etch rate can cause small crevasse that are hard to clean or harm the flow of liquid in the channel assembly in the case of micro-fluidics.

Because each of the above typically require heat, it is necessary to match the thermal-coefficient-of-expansion of each material. If this is not done, when the material returns to room temperature the bonded component will warp and/or break. The adhesive joint will fail in shear or peel if the use temperature is different from the bonding temperature; adhesive shear strength is usually low.

It is therefore desirable to provide a glass-to-glass or other substrate bonding process providing bonding times in a range of minutes as opposed to hours for anodic bonding or heat diffusion bonding. It is further desirable to provide a bonding process with a tolerance to dirt, which can bond through 100 nm diameter particles. It is also desirable that the bonding process provide a selectable width bond-line width 10 to 100 μm with bonded un-bonded discrimination of 100 μm. Additionally, it is desirable that the bonding process is inert and does not over etch in BF/Sulfuric/KOH (as with diffusion bonding) and does not change the charge on the surface of the glass as with anodic bonding. It is also desirable that the bond-line is virtually transparent and the bonding process can structure the bond line as well as conductors and non-conductors within the bonded structure on the same surface. Finally, it is desirable that bonding can be accomplished on a fluidic device loaded with live cultures such as yeast, anthrax or other biological materials without harming them.

SUMMARY

Embodiments disclosed herein provide a process for room temperature substrate bonding in which a first substrate substantially transparent to a laser wavelength is selected. A second substrate for mating at an interface with the first substrate is then selected. A change in index of transmission is created at the interface and the first and second substrates are mated at the interface. The first substrate is then irradiated with a laser of the transparency wavelength substantially focused at the interface and a localized high temperature at the interface from energy supplied by the laser is created. The first and second substrates immediately adjacent the interface are softened with diffusion across the interface to fuse the substrates.

In example embodiments, the transmissivity change may be accomplished by deposition of a blocking heat absorption coating on the surface of one substrate at the interface. In alternative embodiments, the transmissivity change may be accomplished by differing transmissivity of the substrates themselves.

An example embodiment for an apparatus for room temperature laser bonding incorporates an x-axis motion stage mounted to a base and a y-axis motion stage mounted to the x-axis motion stage. A substrate alignment fixture is mounted on the y-axis motion stage adapted to align and secure at least two substrates with a mutual interface as a workpiece. A gantry is mounted to the base and supports alignment optics for a laser to focus on the work piece in the alignment fixture. A controller provides for translation of the x-axis motion stage and y-axis motion stage for motion of the focused laser on the workpiece.

The features, functions, and advantages that have been discussed can be achieved independently in various embodiments of the present disclosure or may be combined in yet other embodiments further details of which can be seen with reference to the following description and drawings.

DETAILED DESCRIPTION

Figure 1:
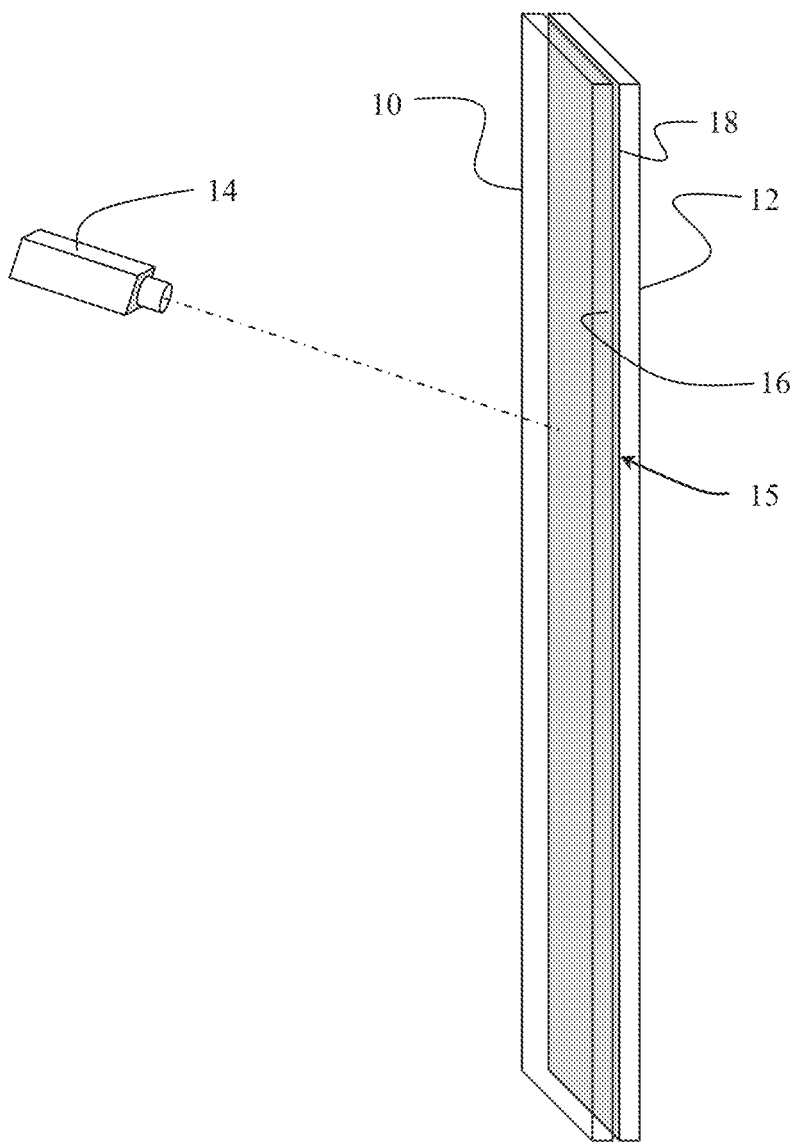
FIG. 1 is a pictorial schematic representation of one embodiment.

Embodiments disclosed herein provide a method and apparatus for bonding of similar substrates such as glass-to-glass and dissimilar substrates such as glass-to-glass (with differing material properties such as coefficient of thermal expansion (CTE)), glass to plastic, glass to silicon and glass to ceramic. Referring to FIG. 1, bonding of the substrates 10, 12 is accomplished using a laser 14 which has a wavelength such that at least one of the substrates (substrate 10 for the example shown) is transparent to that wavelength. An interface 15 between the layers provides a change in the index of transmission or optical transmissivity which results in absorption of laser energy at the interface and localized heating to create a bond. In a first embodiment, a heat absorption layer 16, which is opaque or blocking to the laser wavelength and has an affinity for diffusion into the substrates, is deposited on the mating surface 18 of at least one of the substrates (substrate 12 for the example shown). The heat absorption layer in example embodiments for glass-to-glass and other substrate bonding herein may be a metal, semiconductor or ceramic material. However, in alternative embodiments other materials having appropriate wavelength absorption and diffusion affinity characteristics may be employed. The thickness of the heat absorption layer may be as thin as 10 Å and as thick as desired to compensate for surface roughness or control timing and temperatures of the process as will be described in greater detail subsequently.

The desired change in transmissivity at the interface can also be accomplished through the use of substrate materials having one substrate which is opaque (low transmissivity to the laser wavelength) or a liquid film having a mismatched index of transmission from the initial substrate.

Figure 2:
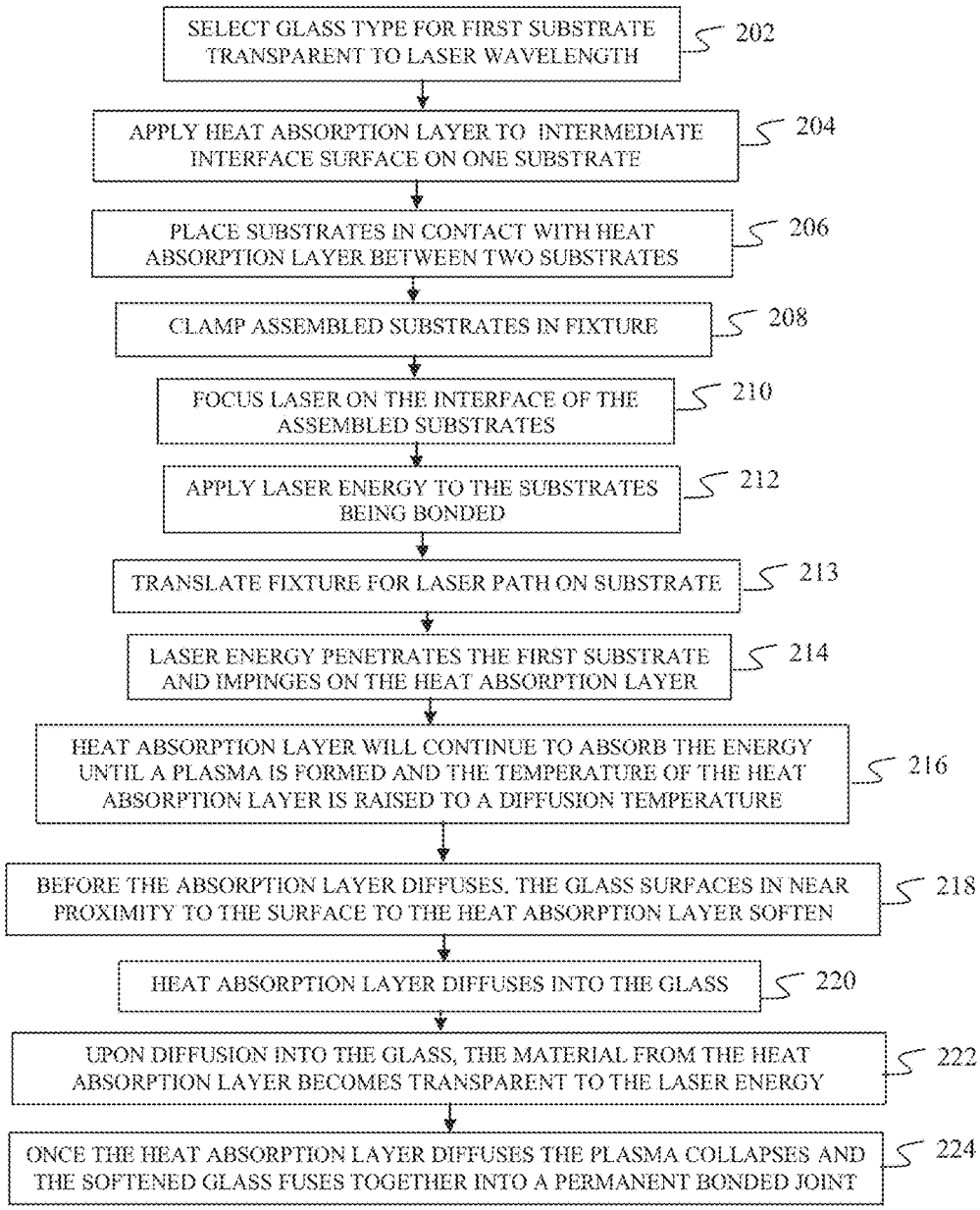
FIG. 2 is a flow chart of the method for room temperature substrate bonding.

The bonding process is accomplished as shown in FIG. 2 with reference to the elements disclosed in FIG. 1 for a first example of a glass-to-glass bond wherein a glass substrate 10 of any type generally transparent to the wavelength of the laser 14 being used is selected as the first substrate, 202. A change in transmissivity is created at the interface 15, using, for the example of the first embodiment, a heat absorption layer 16 applied to either the first substrate 10 or the second substrate 12 to be bonded, 204. The heat absorption layer may be continuous or segmented strips surrounding features in the substrates such as microfluidic channels. The two substrates are then placed in contact with each other with the heat absorption layer being placed such that it is in the interface between the two substrates, 206. The surfaces may or may not be extremely well polished. The thickness of the heat absorption layer can be thickened to compensate for surface roughness. The assembled substrates are then clamped in a fixture, to be described in greater detail subsequently, that is transparent to the wavelength of laser energy being used, 208. The laser is then roughly focused on the interface of the assembled substrates in the fixture, 210. The laser energy is then applied to the substrates being bonded, 212.

The laser energy penetrates the first substrate 12 and impinges on the heat absorption layer, 214. The heat absorption layer will continue to absorb the energy until a plasma is formed and the temperature of the heat absorption layer is raised to a diffusion temperature, 216. However, before the absorption layer diffuses, the glass surfaces in near proximity to the surface to the heat absorption layer soften, 218, until the heat absorption layer diffuses into the glass, 220. Upon diffusion into the glass, the material from the heat absorption layer becomes transparent to the laser energy, 222. Once the heat absorption layer diffuses the plasma collapses and the softened glass fuses together into a permanent bonded joint, 224. It is important to note that the heat absorption layer should diffuse at temperature that is higher than the first transition temperature of the glass to ensure that the glass becomes soft and bonds to the neighboring glass. This approach makes the most robust, least particulate sensitive bond joint.

In this first example of a glass-to-glass bond, the entire process takes place such that the bulk material remains at room temperature and only the heat absorption layer and the materials of the substrates immediately adjacent the bond-line itself are elevated to a temperature where the heat absorption layer is diffused into the glass by the laser. The width of a single bond-line can vary from approximately 0.001 μm to 100 μm or greater and the depth of the bond-line is nominally 500 nm into each component of the structure. However, it can vary from a fraction of a micro-meter to multiple micro-meters.

The disclosed process takes advantage of the affinity of metals, ceramics and semiconductors to diffuse into glass at elevated temperatures making the bond-line virtually transparent both in the visible spectrum and to the laser radiation wavelength. Therefore, the process is self-regulating. When the absorption layer has fully diffused into the glass, the laser energy passes through the glass with no further heating and the reaction stops. Therefore, the glass is never ablated or over-heated by the laser.

The material transparency, for the substrate(s) which the laser passes through, should be at least 70 percent at the wavelength at the laser energy wavelength. This allows sufficient power penetration through glass to the depth of the heat absorption layer. If the laser radiation is absorbed, the glass may crack and absorption layer may not be diffused resulting in an incomplete bond or no bond at all. While laser-transparency is desirable for the layer that the laser passes through, it may not be necessary for the second substrate in the stack to be effectively bonded to the first substrate.

An example fixture for support of the mated substrates during laser bonding processing is shown in FIGS. 3A-3D. A positioning system 30 incorporates an x-axis motion stage 32 mounted on a base 33 and a y-axis motion stage 34 mounted to the x-axis mounting stage. For the embodiment shown, a substrate alignment fixture 36 is mounted on the y-axis motion stage. However, in alternative embodiments, the motion stages may be reversed in vertical stacking and the alignment fixture mounted on the x-axis stage. Each motion stage has a drive motor 38 with associated screw drive 40 or similar translation mechanism. Covers 42 shield the operating elements of the motion stages for operator safety. A gantry 44 provides support for alignment optics 46 for the laser 14, final focusing optics 48, camera 50 and other instrumentation systems as required for monitoring and control of the bonding operation. For the embodiment shown, a power meter 52 is mounted to the x-axis motion stage to be positioned under the laser optical train for measurement and/or calibration of laser power before movement of the alignment fixture under the laser optics for substrate bonding. In the embodiment shown, a z-axis motion stage 54 is provided for vertical positioning of the optical and measurement systems with respect to the alignment fixture. A computer controller 55 is programmable for translation of the x-axis, y-axis and z-axis motion stages for translation of the laser on the workpiece. A single laser may be employed for illuminating multiple substrate work pieces in individual positioning systems by employing beam splitters and focusing optical trains to the multiple positioning systems. It is also possible to replace the fixed lens with an f-theta lens with an X-Y scanner and Z-auto-focus either by itself or in conjunction with a large travel X-Y positioning system.

Figure 3A:
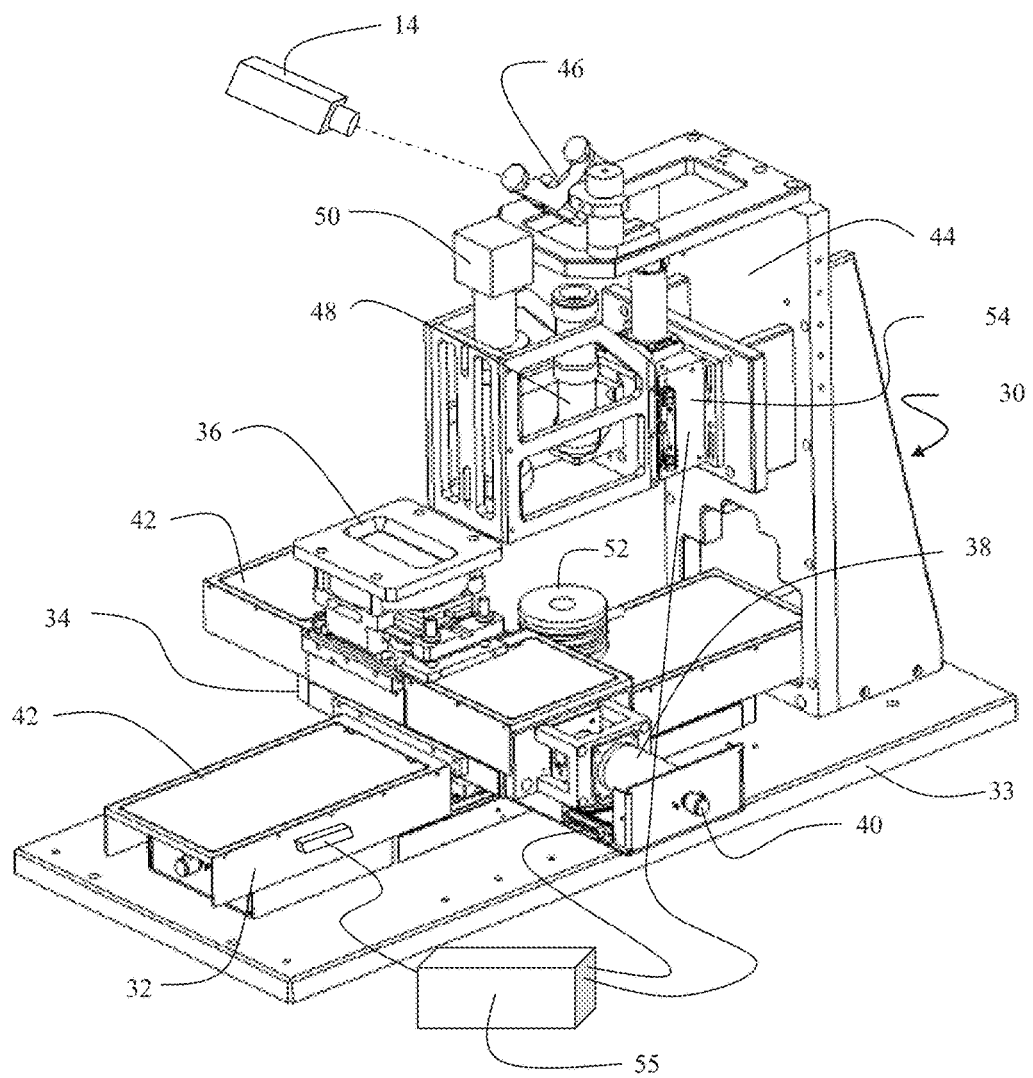
FIG. 3A is a pictorial view of a fixturing and translation system for holding mated substrates and providing laser path guidance.
Figure 3B:
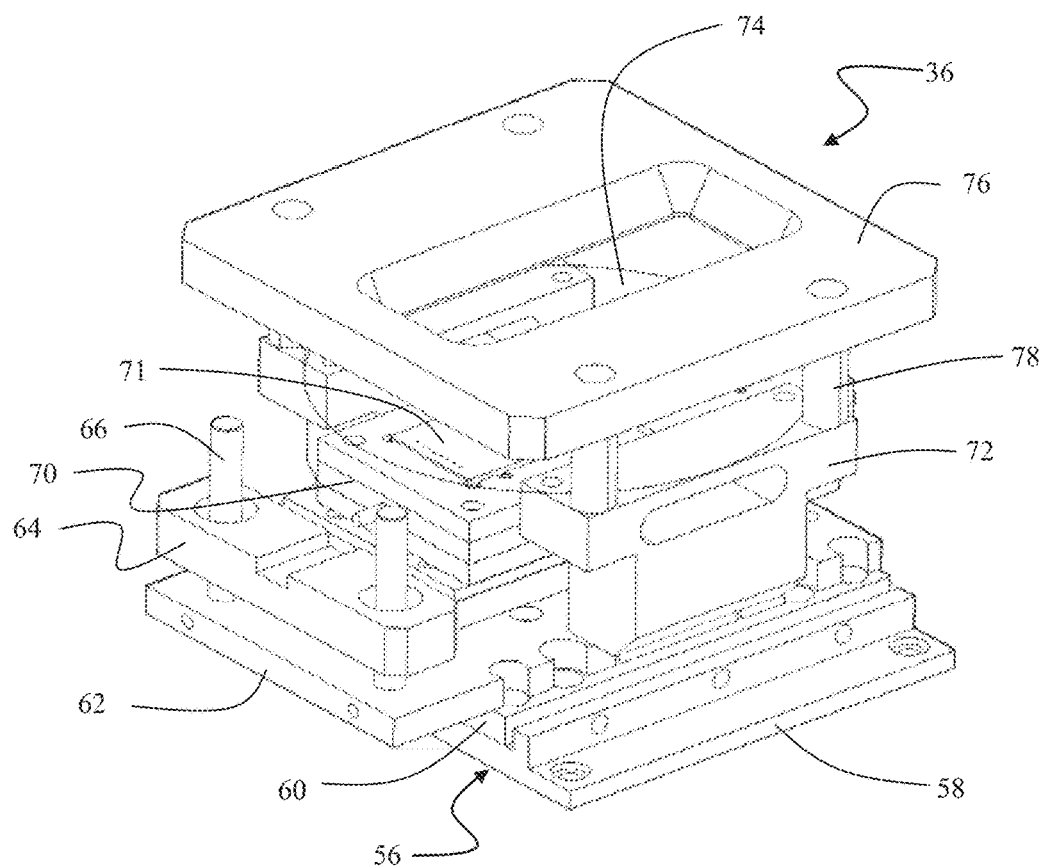
FIG. 3B is a detail view of the substrate alignment fixture.
Figure 3C:
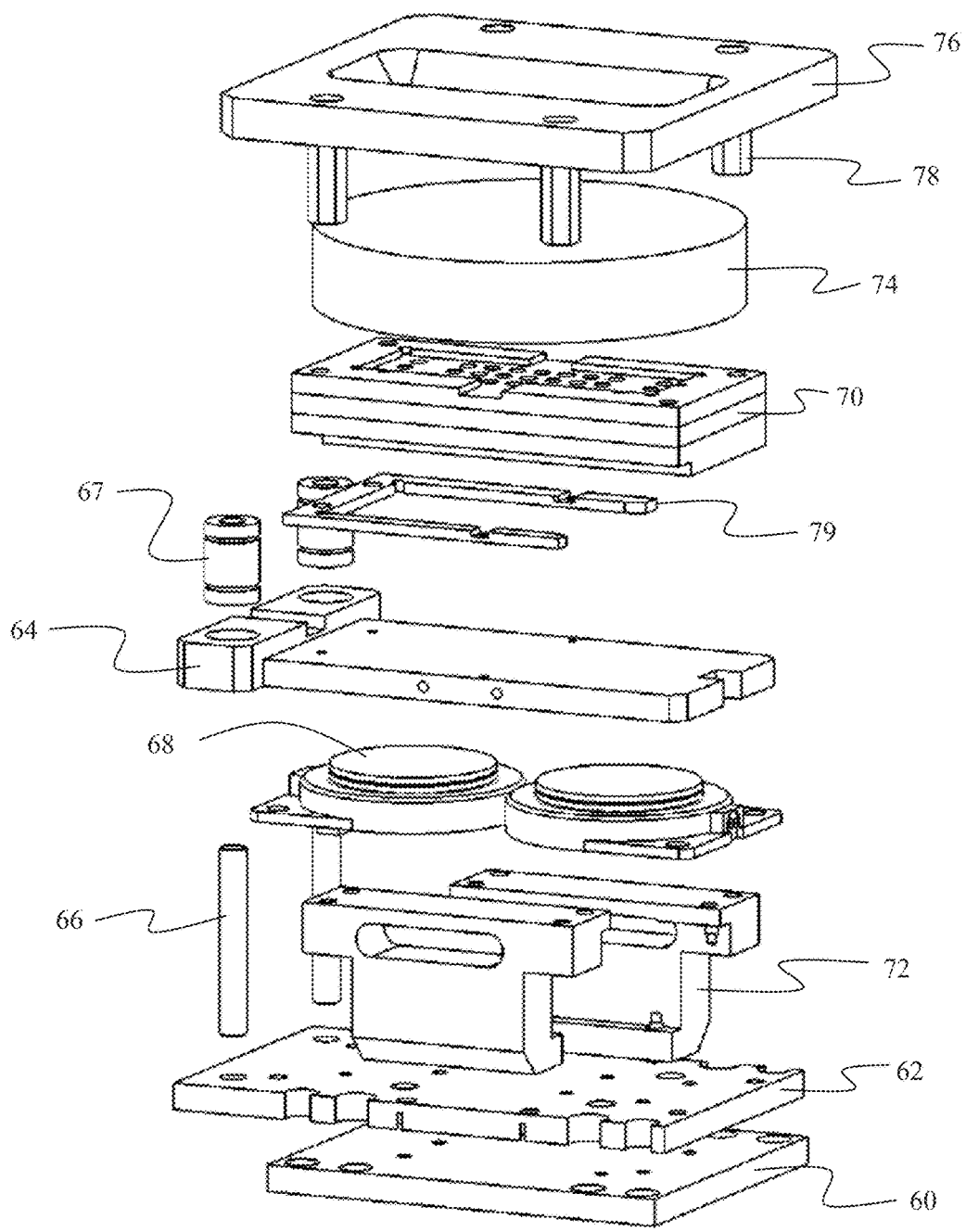
FIG. 3C is an exploded view of the alignment fixture of FIG. 3B.

Details of the alignment fixture 36 are shown in FIGS. 38 and 3C. A mounting structure 56 is provided to mount the alignment fixture to the y-axis stage. For the embodiment shown the mounting structure is fabricated from attachment plate 58, spacer 60 and engagement support plate 62. A vertically translating engagement slider 64 is supported by translation rods 66 received in bushings 67. A pneumatic expansion device 68 positioned intermediate the engagement slider 64 and engagement support plate 62 provides vertical adjustment of the engagement slider as will be described subsequently. A workpiece holding frame 70 supports a workpiece 71 consisting of the mated substrates 10, 12 as will be described in detail with respect to FIG. 3C. Risers 72 extend upward from the engagement support plate 62 to receive an optical flat 74 to be positioned over the holding frame. A securing plate 76 mounted with spacers 78 fixes the optical flat to the risers. The optical flat is transparent to the laser and may be a fused silica or similar material.

Deflation of the pneumatic expansion device 68 lowers the engagement slider 64 allowing insertion of the holding frame 70 into position on the engagement slider. A receiving frame 79 positions the holding frame. Inflation of the pneumatic expansion device urges the engagement slider and holding frame upward compressing the substrate 10 against the optical flat 74.

Figure 3D:
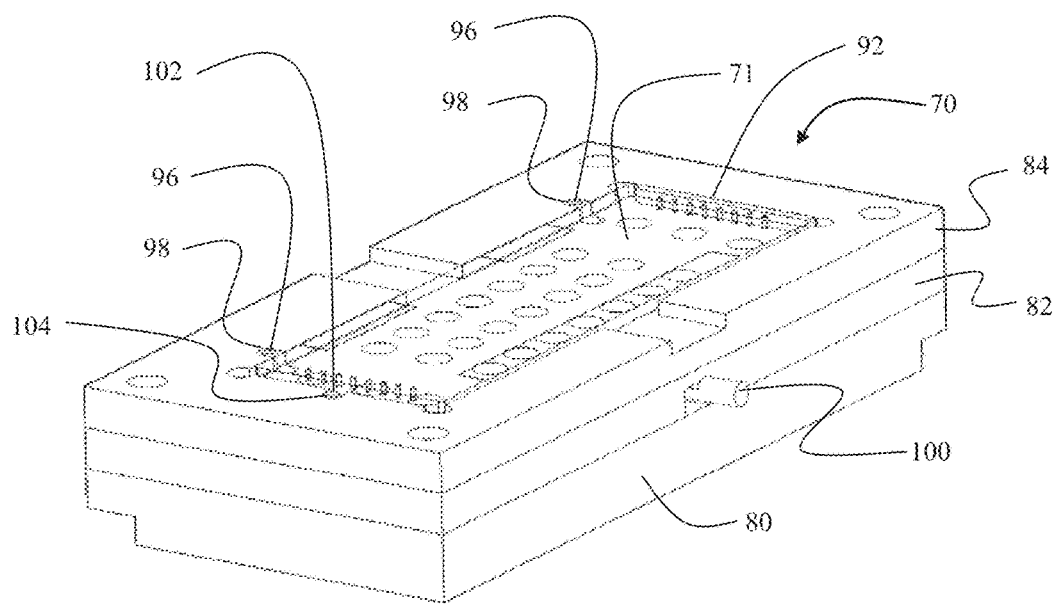
FIG. 3D is a detail view of the substrate holding frame.
Figure 3E:
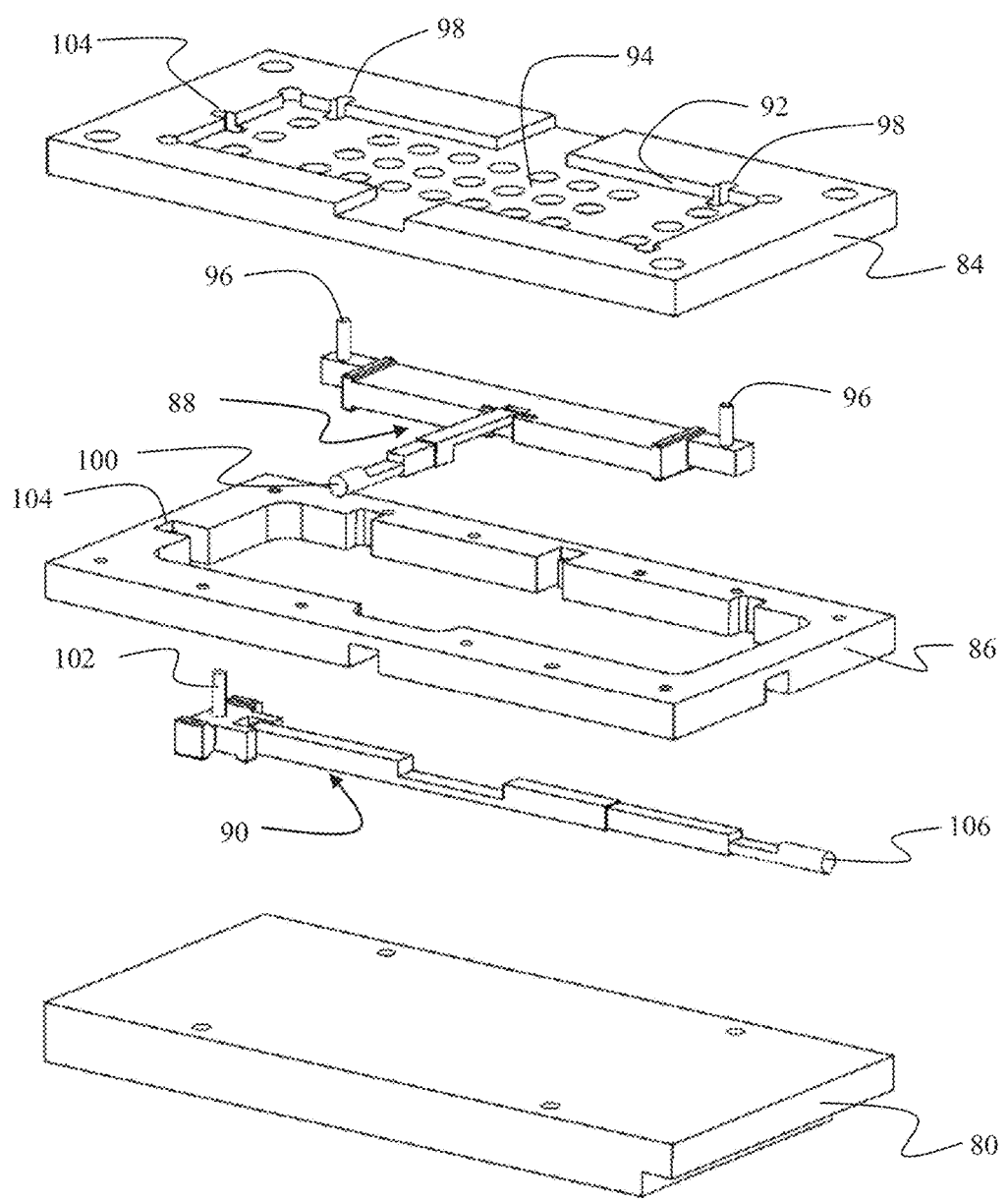
FIG. 3E is an exploded view of the substrate holding fame.

The holding frame 70, as shown in FIGS. 3D and 3E, includes a base 80, a clamping structure 82 and a substrate carrier 84. The clamping structure incorporates a casing 86 which carries a lateral clamp 88 and a longitudinal clamp 90. The substrate carrier 84 has a relief 92 sized to closely receive the substrates 10, 12 supporting the lower substrate on a compliant surface 94 integral to or inserted in the relief 92. A silicon rubber or similar material may be employed for the compliant surface to provide resilient clamping of the substrates against the optical flat after inflation of the pneumatic expansion device. The lateral clamp 88, for the embodiment shown incorporates two vertical arms 96 which extend through slotted apertures 98 in the substrate carrier adjacent the relief 92. The lateral clamp is spring loaded to allow outward displacement of the arms 96 by depressing button 100 for insertion of the substrates into the relief Upon releasing button 100, the arms engage the sides of the substrates and urge the substrates against the wall of the relief opposite the slotted apertures. Similarly, the longitudinal clamp 90 has a single arm 102 extending through a slotted aperture 104 in the substrate carrier adjacent the relief 92. The longitudinal clamp is spring loaded to allow outward displacement of the arm 102 by depressing button 106 for insertion of the substrates into the relief. Upon releasing button 106, the arm engages the ends of the substrates and urges the substrates against the wall of the relief opposite the slotted aperture. The substrates are securely positioned against two perpendicular surfaces of the relief.

The alignment fixture 36 mounted on the x-axis motion stage 42 and y-axis motion stage 44 allows translation of the substrate workpiece 71 under the laser beam emitted from the final optics for exposing the heat absorption layer. A tracking path may be programmed into the controller 55 for motion stages attached to the holding tool to allow the laser beam impinging on the mated substrates to follow features in the substrates such as microfluidic channels, shown as step 213 in FIG. 2. While translation of the substrate holding fixture is employed for the embodiment described, alternative embodiments may employ a stationary hold fixture with translating motion of the laser or laser beam through optical means.

A laser light trap is required in the bonding fixture such that the laser energy does not burn the fixture or reflect and damage some other aspect of the component. For the disclosed embodiment, the silicon rubber compliant surface 94 absorbs the laser and does not burn. A polytetrafluoroethelyne (PTFE) layer such as Teflon® could alternatively be employed or physically defined light traps under the glass chip such as those offered by. Thorlabs, 435 Route 206 North Newton, N.J. 07860 may be incorporated into the fixture.

Additional examples of the process are provided below.

Example 1 Substrates of Different Thermal Coefficient of Expansion (TCE)

Traditional bonding processes typically occur at elevated temperatures, where a vastly different TCE generates severe temperature distortion when the bonded assembly cools down. However, with laser bonding process disclosed herein it is possible to bond dissimilar TCE materials at the temperature. Since the bulk temperature of the material being bonded can be set at the temperature of use, the TCE while still being different does not stress or otherwise distort the substrate material because it does not see a temperature change.

For example when fusion bonding two substrates that are 150 mm in diameter with a ICE that differs by 7 ppm/° C. at a temperature of 100° C. The differential change in length from the top to the bottom substrate causes an engineering strain of 0.07% translating into a tensile stress in the bottom substrate of 54.6 Mpa (7.92 kpsi). Most glasses, for example, will fail in tension between 1 to 2 kpsi when not stabilized.

When anodic bonding 7 ppm/° C. glass to silicon, it is common for the bonding temperature of the glass to be 400° C. Such a temperature will cause a tensile stress of over 200 Mpa. This will fracture the glass. However, a room temperature laser bonded substrate stack employing the process described will never be exposed to such a large change in temperature and therefore, will not fracture during the process of bonding. Post bonding, the substrates, which may be in the form of wafers, will be diced into smaller components. When length reduction occurs, the stress is reduce by the length reduction of the component as compared to the length of the wafer, i.e., a component that will see a 100° C. that is 10 mm long will experience a stress of 5.5 Mpa (0.8 kpi). Glass will very easily survive this stress.

Example 2 Different Light Transmission at a Similar Laser Radiation Wave Length It is a common practice to bond glass packaging to a silicon chip. When performing this process, it is usually necessary to match the CTE of each of the materials and to use a glass material with sodium atoms that can migrate during the elevated temperature bonding process. While there are commercially available glass materials that exhibit such properties, they are hard to process during such steps as introducing a via. Photo-sensitive glass ceramic material, such as Forturan, is easy to structure; however, it has a CTE of 10 ppm/° C. and does not contain sodium ions. These two attributes make it nearly impossible to anodic bond to silicon. While it can be fusion bonded, it requires being heated to 500° C. Such a high temperature change will cause the glass-silicon assembly to fracture during the cool down process.

While diffusion or Anodic bonding Forturan to Silicon is not practical, the laser bond process described herein may be employed for structured Fortruan to silicon or many other ceramics or metals. Since the process of room temperature laser bonding requires a transmissivity change at the interface for creating a heat absorption layer, a transparent plate of glass to a second substrate or blocking plate of material opaque to the laser wave length is employed in much the same manner as for two transparent substrates. However, when bonding a full blocking plate to a transparent plate the process will not be self-regulating and requires that the process must be very carefully controlled such that the blocking plate does not get exposed to so much power that the surface becomes ablated. This is done by controlling the laser fluence such that the surface of the second substrate at the interface is heated to well beyond the first transition temperature of the glass, such that the glass softens under the laser radiation being absorbed by the second substrate. This will ensure that during the cooling process silicon dioxide bonds will form at the interface and adhere each of the components to each other. This process functions with glass to silicon, glass to ceramics, glass to metals and glass to plastics bonding.

Figure 4:
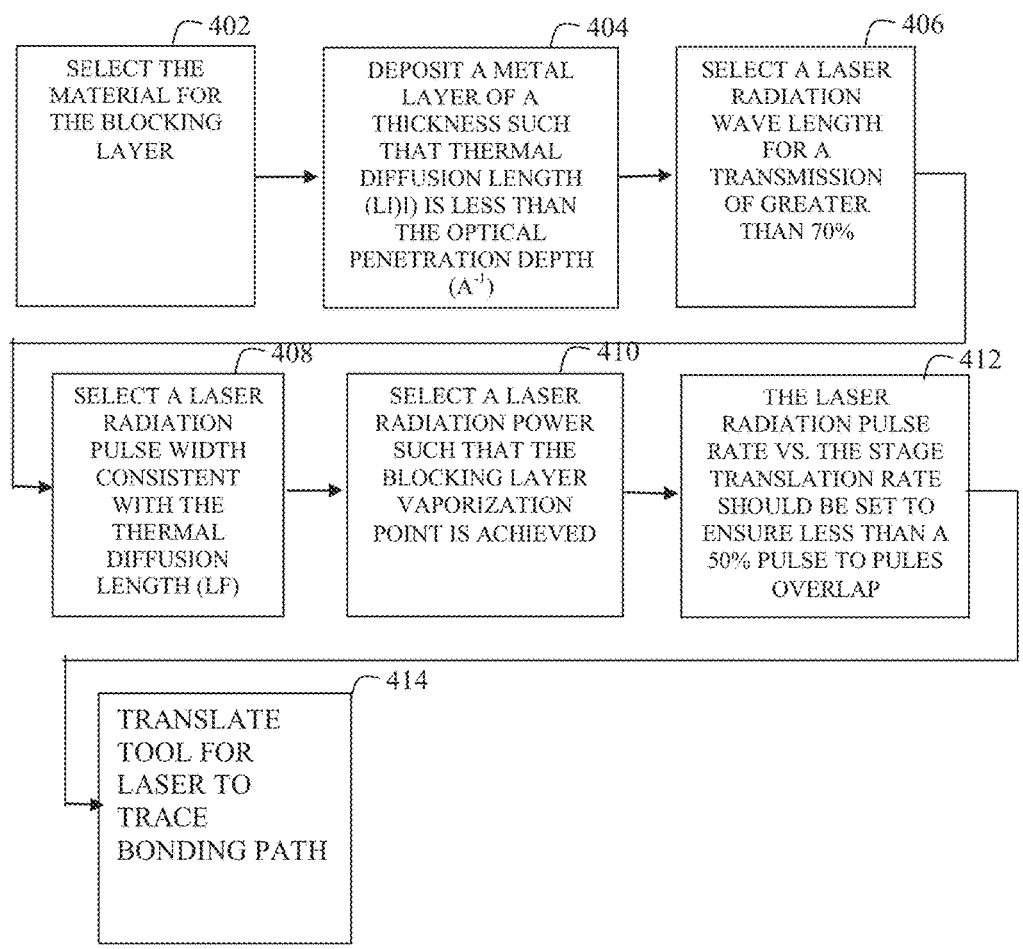
FIG. 4 is a flow chart of process control steps for room temperature substrate bonding; and, FIG. 5 is a flow chart of an example embodiment for processing of leads integrally with bonding of the substrates.

An example of process control for the laser bonding process when applied to materials as in Example 2 is shown in FIG. 4 wherein the initial step is selecting the material for the blocking heat absorption layer, 402. A layer of the blocking heat absorption material is then deposited in a layer of a thickness such that thermal diffusion length ($Lf_t$) is less than the optical penetration depth ($\alpha^{-1}$), 404. The layer may be deposited on either the first or second substrate on the interfacing surface. A laser radiation wave length is then selected for a transmission of greater than 70%, 406. A laser radiation pulse width is selected consistent with the thermal diffusion length ($Lf_t$), 408. A laser radiation power is selected such that the blocking layer vaporization point is achieved, 410. The stage translation rate for the holding tool is controlled to ensure that at the laser radiation pulse rate less than a 50% pulse to pulse overlap is present, 412. The holding tool is then translated to achieve the desired laser path on the mated substrates to effect the bond, 414.

Example 3 Glass-to-Plastic Bonding

Glass to plastic bonding is very similar to the above process with one limitation; the blocking layer should be a relatively low temperature diffusion material such that it does not melt the polymer being attached to the glass. A particularly good material with a low diffusion temperature is AuSn (gold-tin eutectic). A gold-tin blocking heat absorption layer has a diffusion temperature of 280° C. Another helpful attribute is that the laser-pulse-width approaches the thermal-time-constant of the blocking heat absorption layer, i.e., in the femto-second regime. The shorter the pulse length, the less likelihood there is to burn or melt the polymer prior to bonding the high-melting-temperature glass material to the lower temperature melting plastic material. It is also possible to use infrared laser radiation without an interlayer and use the blocking nature of the polymer at this wavelength to perform the bonding.

Example 4 Silicon to Glass Bonding

In the previous process descriptions, the laser transmission wavelength was selected such that the laser light was allowed to transmit through the visibly transparent substrate to the visibly blocking substrate. However, this is not always possible, desired nor is it required. For example, silicon has a 55% light transmission between 1 μm and 10 um wave lengths while Bk-7 glass has a near zero transmission above a 3 um wave length. This makes it possible to use a CO2 laser to penetrate the silicon but not the glass. Such a process can be used to perform silicon back side attach to the front side of glass while aligning the laser on the bond location at the interface between the substrates. The laser is going through the silicon, hitting the glass/metal blocking layer and bonding.

Under certain circumstances, such as providing bonding of substrates with pre-filled microfluidic channels, it is necessary or desirable to pre-coat or pre-fill the substrate surfaces or channels in one or both the substrates with either a 10 nm to 100 nm thick coating or a bioactive fluid respectively. With current bonding processes that heat the substrates over room temperature, the films or fluids will either be carburized or super-heated thereby destroying the films, boiling off the fluid and killing the live culture. The laser bonding process described herein does not raise the temperature of the bulk substrate and therefore, does not damage the surface coating, boil the fluid in the channels or kill the active culture. The heat affected zone from laser bonding is approximately 1 um. It has also been shown to bond through 100 nm thick layers of Teflon, Paraline and other polymers.

Additionally, a unique attribute of the room-temperature laser bonding process described herein is the ability to form structure conductive leads into the same interface layer that is being bonded. The structure of the leads is formed by the laser track on the mated substrates at the time of bonding. Therefore, it is not necessary to pattern the bonding layer to create a contact lead structure. This also makes for a very green process by avoiding currently required deposition and etching processes.

Figure 5:
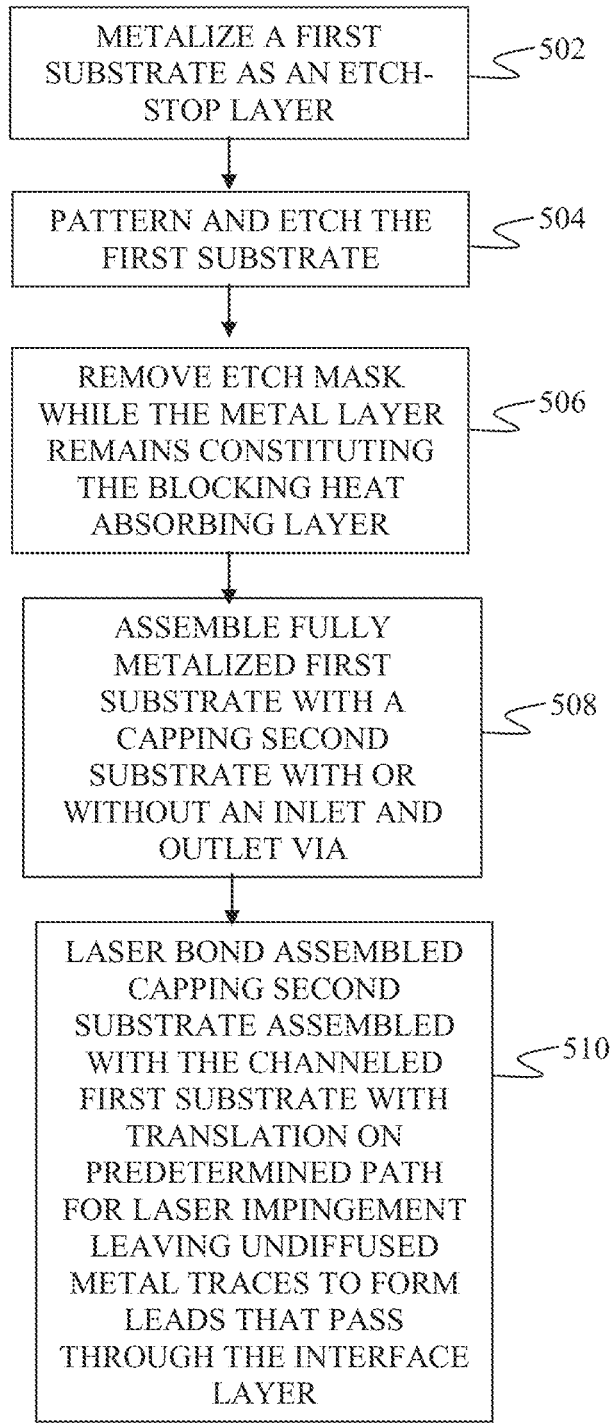

For example, if an array of electrolysis channels requires multiple connections to each channel to drive the process, the connections may be formed coincident with the bonding process. As shown in FIG. 5, the entire first substrate is metalized, 502, and used as an etch-stop layer. The channel would then be patterned and etched, 504. The etch mask is then removed while the metal layer remains, 506. The metal layer constitutes the blocking heat absorbing layer. The fully metalized first substrate is then assembled with a capping second substrate that may or may not be structured with an inlet and outlet via, 508. The capping second substrate assembled with the channeled first substrate is then laser bonded together with translation on the predetermined path for laser impingement leaving undiffused metal traces to form leads that pass right through the interface layer, 510.

The leads do not leak, even though they pass through the bond interface because the bonding process put the interface in compression when it cools. This causes the channel substrate to clamp down on the surface substrate creating a tight seal. When the lead needs to be wide, the lead can be divided into sections such that the compression is applied to a narrow strip but the lead itself remains conductively wide. It is also possible to bond the traces to the adjacent glass without totally diffusing the metal into the glass. The undiffused metal traces may be laser bonded with a shorter pulse length and therefore would bond but not hilly diffuse the layer of metal into the glass. Leaving the glass bonded but yet conductive.

Finally this process can act upon multiple substrate interfaces at the same time. Because the laser process is self-regulating and substrates and the blocking heat absorption layer become transparent to the laser radiation upon diffusion of the heat absorption layer, the laser will pass through the first interface to the next interface and bond it at the same time. While it is not necessary to limit the number of interfaces to a particular number, experiential data indicates that as many layers as seven interfaces can be bonded at one time while leaving contact leads within each interface.

For the embodiments described, when bonding one substrate to another, it is best to begin with at least a 100 nm Ra surface finish on interfacing surface of each substrate to be bonded. It is possible for the substrates to be as rough as 1 um Ra; however, the hermitic nature of the bond will be questionable unless the blocking/metal layer is substantially thicker. The substrate must be cleaned and free of debris as is the case with anodic or fusion bonding. However, since this bonding process does not require being 100% bonded over the entire surface but rather can be seam sealed, the statistics of a good bond are weighted in the direction of a greater yield than that of a typical bonding process.

When bonding two transparent substrates, it is necessary to apply a metallic/blocking layer on the surface of one of the substrates. For a typical 4 Å Ra surface finish, 100 nm of Cr is sufficient as a blocking heat absorption layer.

The substrates should be clean to a suggested sub-100 nm particle/10 mm contamination before being assembled with the blocking layer disposed toward the adjacent transparent substrate. In the case of thin substrates, it is necessary to apply pressure to the outer surfaces of the each substrate thereby, clamping the substrates together such that no gaps exist between them. Clamping can take place using physical external contact force as described for the example support fixtures or by applying a vacuum to draw that air out from between the surfaces of the substrates.

When using a physical clamp, a compliant layer, such as silicone rubber, is disposed on the outer surface of one substrate and a relatively hard (fused silica), transparent surface on the opposing outer substrate. Example embodiments employ 138 kPa (20 psi) as a sufficient amount of pressure to ensure intimate contact between the inside adjacent surfaces.

When applying a vacuum for clamping thicker substrates, one can use the process known in the art of a typical wafer aligner. However, a blanket expose light is not used to expose a light sensitive chemical, but rather, a laser is used to diffuse the blocking layer.

With the substrate surfaces in close contact, the assembled workpiece can be loaded into a motion platform of the type whereby either the stage positions the substrate under the laser beam or whereby a scanner using an f-theta lens positions the beam over the substrate; either process can be adopted for the purpose of precision or speed, respectively.

Control software is required to position the stage, scanner or stage/scanner assembly. For example embodiments, three dimensional computer aided design software creates the bonding path, which is then translated into C-code by computer aided manufacturing software and then again is post processes it into motion board position commands.

When bonding thin substrates, care must be taken to not over write the previously bonded path. This is because the transmission of the laser through the substrate changes once the blocking layer is absorbed into the glass. Typically, the transmission is reduced and therefore will cause the substrate to absorb enough laser energy to cause a local rise in temperature (under the laser radiation beam) and thereby cause undue stress, due to the CTE of the material, in the thinner substrate and potentially fracture the assembly. Since a laser radiation beam, that does pass through an aperture, typically has a Gaussian distribution, it is best to interleave the space between the tail and the main beam of a first pass with the tail of a second pass. This will usually ensure that the substrate will not fracture.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. An apparatus for room temperature laser bonding comprising:
   an x-axis motion stage mounted to a base;
   a y-axis motion stage mounted to the x-axis motion stage;
   a substrate alignment fixture mounted on the y-axis motion stage, said alignment fixture adapted to align and secure at least two substrates with a mutual interface as a workpiece wherein the substrate alignment fixture comprises:
      a mounting structure to mount the alignment fixture to the y-axis stage;
      a vertically translating engagement slider supported by translation rods extending from the mounting structure;
      an expansion device positioned intermediate the engagement slider and the mounting structure for vertical adjustment of the engagement slider;
      a workpiece holding frame to support the workpiece;
      risers extending upward from the mounting structure to receive an optical flat to be positioned over the holding frame; and
      a securing plate mounted with spacers to fix the optical flat to the risers;
      whereby retraction of the expansion device lowers the engagement slider allowing insertion of the holding frame into position on the engagement slider, and inflation of the pneumatic expansion device urges the engagement slider and holding frame upward compressing the workpiece against the optical flat; and
   a gantry mounted to the base and supporting alignment optics for a laser beam to focus on the workpiece in the alignment fixture, said x-axis motion stage and y-axis motion stage adapted to translate the focused laser beam on the workpiece.

2. The apparatus as defined in claim 1 wherein the holding frame includes a base, a clamping structure and a substrate carrier.

3. The apparatus as defined in claim 2 wherein the clamping structure incorporates a casing which carries a lateral clamp and a longitudinal clamp and the substrate carrier has a relief sized to closely receive the substrates of the workpiece supporting the lower substrate on a compliant surface.

4. The apparatus as defined in claim 3 wherein the lateral clamp incorporates first and second vertical arms which extend through first and second slotted apertures in the substrate carrier adjacent the relief, the lateral clamp spring loaded to allow outward displacement of the arms by depressing a button for insertion of the substrates into the relief, said arms engaging the sides of the substrates and urge the substrates against the wall of the relief opposite the slotted apertures upon releasing of the button.

5. The apparatus as defined in claim 3 wherein the longitudinal clamp has a third arm extending through a third slotted aperture in the substrate carrier adjacent the relief, said longitudinal clamp spring loaded to allow outward displacement of the third arm by depressing a second button for insertion of the substrates into the relief, the third arm engaging the ends of the substrates and urging the substrates against the wall of the relief opposite the third slotted aperture upon releasing the second button thereby securely positioning the substrates against two perpendicular surfaces of the relief.

6. The apparatus as defined in claim 1 wherein each motion stage has a drive motor with associated screw drive.

7. The apparatus as defined in claim 1 further comprising a z-axis motion stage for vertical positioning of the alignment optics with respect to the alignment fixture.

8. The apparatus as defined in claim 1 wherein the optical flat is transparent to the laser.

9. The apparatus as defined in claim 8 wherein the optical flat is a fused silica.

10. The apparatus as defined in claim 1 wherein the expansion device is pneumatic.

* * * * *